(12) United States Patent
Sawada et al.

(10) Patent No.: US 7,973,831 B2
(45) Date of Patent: Jul. 5, 2011

(54) SOLID-STATE IMAGE SENSOR AND IMAGING APPARATUS USING THE SAME

(75) Inventors: Yasuhiro Sawada, Tokyo (JP); Takehiro Minato, Tokyo (JP); Takashi Masuda, Tokyo (JP)

(73) Assignee: Acutelogic Corporation, Tokyo (JP)

( * ) Notice: Subject to any disclaimer, the term of this patent is extended or adjusted under 35 U.S.C. 154(b) by 0 days.

(21) Appl. No.: 12/747,791

(22) PCT Filed: Dec. 8, 2008

(86) PCT No.: PCT/JP2008/072228
§ 371 (c)(1),
(2), (4) Date: Jun. 11, 2010

(87) PCT Pub. No.: WO2009/075243
PCT Pub. Date: Jun. 18, 2009

(65) Prior Publication Data
US 2010/0277628 A1    Nov. 4, 2010

(30) Foreign Application Priority Data
Dec. 12, 2007   (JP) .................................. 2007-320455

(51) Int. Cl.
H04N 5/225        (2006.01)
H04N 9/083        (2006.01)
(52) U.S. Cl. ..................................... 348/230.1; 348/272
(58) Field of Classification Search .......................... None
See application file for complete search history.

(56) References Cited

U.S. PATENT DOCUMENTS

| 6,124,888 | A | 9/2000 | Terada et al. |
| 6,366,318 | B1 | 4/2002 | Smith et al. |
| 6,452,632 | B1 | 9/2002 | Umeda et al. |
| 2002/0145669 | A1 | 10/2002 | Umeda et al. |
| 2003/0227552 | A1 | 12/2003 | Watanabe |
| 2004/0196396 | A1 | 10/2004 | Fujii et al. |
| 2007/0222874 | A1 | 9/2007 | Yamamoto |

FOREIGN PATENT DOCUMENTS

CN    1536895 A    10/2004

(Continued)

OTHER PUBLICATIONS

Notice of Reasons for Rejection mailed on Mar. 31, 2009 in corresponding Japanese Patent Application No. 2007-320455 (with translation).

(Continued)

*Primary Examiner* — Lin Ye
*Assistant Examiner* — Euel K Cowan
(74) *Attorney, Agent, or Firm* — Marvin A. Motsenbocker; Mots Law, PLLC (57) ABSTRACT

An objective is to provide a solid-state image sensor which can reduce the pixel rate while restraining the reduction in the angle of view and the deterioration in image quality when image data is output from the image sensor, and an imaging apparatus using the image sensor. A solid-state image sensor includes: plural photoelectric conversion elements which respectively have color filters being divided into plural groups each including color filters of plural colors, the groups being cyclically provided; and an signal output unit which mixes up digital signals, which are output via the A/D converter, at predetermined sampling positions and at predetermined different rates, and outputs signals which are smaller in number than the photoelectric conversion elements, and sampling gravity centers of the signals output from the signal output unit are at equal intervals.

10 Claims, 9 Drawing Sheets

FOREIGN PATENT DOCUMENTS

| | | |
|---|---|---|
| JP | A-9-247689 | 9/1997 |
| JP | A-10-224696 | 8/1998 |
| JP | A-2000-261814 | 9/2000 |
| JP | A-2004-312140 | 11/2004 |
| JP | 2006-262382 A | 9/2006 |
| JP | A-2006-262382 | 9/2006 |
| JP | A-2007-88733 | 4/2007 |
| JP | A-2007-259109 | 10/2007 |

OTHER PUBLICATIONS

Chinese Office Action mailed on Mar. 25, 2010 in corresponding Chinese Patent Application No. 2010032200579260 (with partial translation).

International Search Report mailed on Mar. 17, 2009 in corresponding International Application No. PCT/JP2008/072228 (with translation).

FIG. 1

FIG.2(a)
BAYER IMAGE

FIG.2(b)
Gr SCANNING RANGE  R SCANNING RANGE  BINNING READOUT

B SCANNING RANGE   Gb SCANNING RANGE

FIG.2(c)
Gr FILTER

FIG.2(d)
R FILTER

FIG.2(e)
B FILTER

FIG.2(f)
Gb FILTER

FIG.2(g)
1/2 OUTPUT IMAGE

FIG.3(a) BAYER IMAGE

FIG.3(b)
G SCANNING RANGE  BINNING READOUT  Cy SCANNING RANGE

Ye SCANNING RANGE    Mg SCANNING RANGE

FIG.3(c) G FILTER

FIG.3(d) Cy FILTER

FIG.3(g) 1/2 OUTPUT IMAGE

FIG.3(e) Ye FILTER

FIG.3(f) Mg FILTER

FIG.4(a) BAYER IMAGE

FIG.4(b) C1,C2 GENERATION

FIG.4(c) Y FILTER

FIG.4(d) C2 FILTER

FIG.4(f) 1/2 OUTPUT IMAGE 4:2:2

FIG.4(e) C1 FILTER

FIG.4(g) 1/2 OUTPUT IMAGE 4:2:0

FIG.5(a) PIXEL CONFIGURATION

FIG.5(b) PIXEL CONFIGURATION

FIG.6(a)

LPF+BINNING

FIG.6(b)

1/2 OUTPUT IMAGE

| G | Cy | G | Cy |
|---|----|---|----|
| Ye | Mg | Ye | Mg |
| G | Cy | G | Cy |
| Ye | Mg | Ye | Mg |

FIG.7(a)

LPF+BINNING

FIG.7(b)

1/2 OUTPUT IMAGE

| Mg | Ye | Mg | Ye |
|----|----|----|----|
| Cy | G  | Cy | G  |
| Mg | Ye | Mg | Ye |
| Cy | G  | Cy | G  |

FIG.8(a) ODD FRAME

FIG.8(b) EVEN FRAME

FIG.8(c) BRIGHTNESS

FIG.8(d) COLOR DIFFERENCE

SOLID-STATE IMAGE SENSOR AND IMAGING APPARATUS USING THE SAME

TECHNICAL FIELD

The present invention relates to a single-chip color image sensor, and particularly relates to a single-chip color image sensor which is able to output a high-definition image signal at high speed and is usable for both still image display and moving image display, and an imaging apparatus using the image sensor.

BACKGROUND ART

A known image processing method for imaging apparatuses such as digital cameras is such that a subject image is formed on an image sensor through a lens, and this image sensor conducts photoelectric conversion of the subject image so as to generate an image signal.

Recent imaging apparatuses such as digital cameras often have moving image capture capability in addition to still image capture capability. On the other hand, video cameras are often required to have high-definition still image capture capability. As such, imaging apparatuses such as digital cameras and video cameras are required to have both high-definition still image capture capability and high-definition (e.g. hi-vision) moving image capture capability.

Such imaging apparatus which can capture both still images and moving images are typically arranged so that, while incase of still image capture a high-definition image is generated by reading out signals from all pixels, in case of moving image capture an image is generated by reading out signals from a limited number pixels rather than from all pixels, for the purpose of high-speed readout and less power consumption.

For example, a 8M-pixel image sensor (so-called solid-state image sensor) is typically used for still image capture. In this regard, provided that the depth of each pixel is 12 bits, the image sensor (i.e. the solid-state image sensor of the present invention) is required to output information of 8M pixel*12 bit/pix=96 Megabits.

While the time required for output is not really a problem in still image capture, moving image capture involving moving image readout at a high-speed frame rate of for example 30 fps requires the image sensor to output information of 96 Mbit/frame*30 frame/sec=2.88 Gbps, when signals are obtained from all pixels of the 8M-pixel image sensor. Since such an output data rate is unrealistic and consumes a considerable amount of power, moving image capture requires to limit the number of pixels of the image sensor from which signals are output.

A known method to limit the number pixels from which outputs of the image sensor are made is cut-out output in which a part of a screen is cut out and output.

For example, in the cut-out output, an image sensor which uses 8 megapixels for a still image outputs a 2-megapixel moving image in such a way that a central part of the screen which is a quarter of the entire screen is cut out and output. This method is disadvantageous in that the angle of view in moving image capture is narrower than that of still image capture.

Other known methods to limit the number of pixels output from an image sensor are decimation output in which signals output from pixels are decimated and pixel mixture output in which plural pixel signals of the same color are mixed with one another and output (see e.g. Patent Document 1 (Japanese Unexamined Patent Publication No. 2007-088733)). For example, a signal for one pixel is output from 2×2 pixels aligned in vertical and horizontal directions by performing decimation or pixel mixture, with the result that the output data rate is reduced to ¼.

Figure 9A:
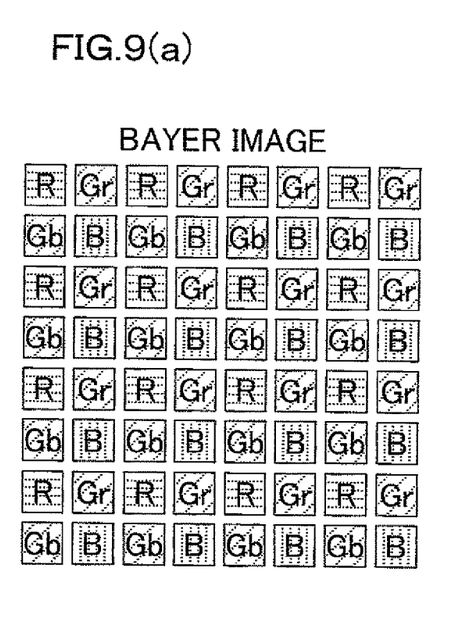
FIG. 9 illustrates a conventional example of decimation of output signal in a color image sensor.
Figure 9B:
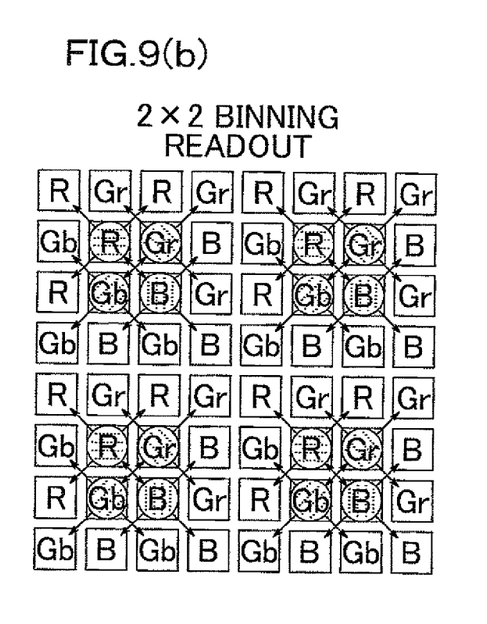

For example, as shown in FIG. 9, a color image sensor having Bayer-arranged color filters of R (red), G (green), and B (blue) primary colors is arranged so that G output pixels are disposed in a checkerboard pattern, and a row in which G output pixels and R output pixels are alternated and a row in which B output pixels and G output pixels are alternated are alternated. A pixel mixture output of this case is generated in such a way that pixel signals of 2×2 pixels surrounding a target pixel are added up so that a single signal is generated.

More specifically, in case of a Bayer-arranged pixel group in FIG. 9(a), signals are obtained from 4 pixels of the same color, which are vertical two pixels sandwiching another pixel therebetween and horizontal two pixels sandwiching another pixel therebetween. The signals are mixed and added up as shown in (b), and pixel data is reduced as shown in (c) and output.

DISCLOSURE OF THE INVENTION

The decimation output, however, is disadvantageous in that, in the image sensor there are pixels which receive light but no signal is read out therefrom, as a result of limiting the number of pixels of the image sensor from which signals are output, and hence the resolution of the output image data is deteriorated.

In addition to the above, as shown in FIG. 9, adopting the pixel mixture output to a Bayer-arranged color image sensor causes problems such that native resolution is less than halved and folding noise occurs, because the Bayer arrangement becomes disorganized.

Figure 9C:
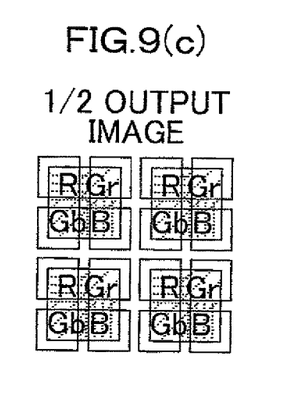

More specifically, as shown in FIG. 9(c), a pixel arrangement (sampling gravity centers) of mixture output of R, Gr, Gb, and B becomes different from the correct grid arrangement. For example, the distance between R and Gr and the distance between Gb and B become less than one pixel horizontally, whereas the distance between Gr and R and the distance between Gb and B which are subsequent to the above become more than one pixel. Furthermore, in the vertical direction, the distance between R and Gb and the distance between Gr and B become less than one pixel, whereas the distance between Gb and R and the distance between B and Gr subsequent to the above become more than one pixel.

In consideration of the above, an object of the present invention is to provide a solid-state image sensor which can reduce the pixel rate while restraining the reduction in the angle of view and the deterioration in image quality when image data is output from the image sensor, and an imaging apparatus using the image sensor.

A solid-state image sensor according to claim 1, which was invented to achieve the object above, includes: plural photoelectric conversion elements which form a grid pattern and output analog signals in accordance with amounts of received light; and an A/D converter which quantizes the analog signals output from the photoelectric conversion elements into digital signals and outputs the digital signals, wherein, the photoelectric conversion elements respectively have color filters which allow different color components to pass through, and the color filters are divided into plural groups each including color filters of plural colors, the groups being cyclically provided, a signal output unit is further provided to mix up the digital signals, which are output via the A/D converter, at predetermined sampling positions and at predetermined different rates, and outputs signals which are smaller in number than the photoelectric conversion elements, and sampling gravity centers of the signals output from the signal output unit are at equal intervals.

The solid-state image sensor according to claim 1 can reduce the pixel rate while restraining the reduction in the angle of view and the deterioration in image quality when image data is output from the image sensor, because the signal output unit is provided to mix up plural digital signals, which are output via the A/D converter, at predetermined sampling positions and at predetermined different rates, and outputs signals which are smaller in number than the photoelectric conversion elements, and sampling gravity centers of the signals output from the signal output unit are at equal intervals.

The solid-state image sensor according to claim 1 can restrain the deterioration in image quality without changing the RGB pixel intervals when a reduced image is generated from Bayer-arranged pixels, in such a way that, as recited in claim 2, the color filters are Bayer-arranged with RGB primary colors and the signals generated by the signal output unit are also Bayer-arranged with RGB primary colors.

The solid-state image sensor according to claim 1 may be arranged, as recited in claim 3, so that the signal processor mixes up optical outputs having the plural different colors.

The solid-state image sensor according to any one of claims 1 to 3 may be arranged, as recited in claim 4, such that the signal processor is arranged to differentiate, in each frame, a mixture rate of the optical outputs having the plural colors, even at identical sampling positions. This makes it possible to generate high-quality images.

The solid-state image sensor according to claim 3 or 4 may be arranged, as recited in claim 5, such that the color filters are Bayer-arranged with red, green, and blue primary colors, and the signals generated by the signal output unit represent cyan, yellow, green, and magenta.

The solid-state image sensor according to claim 3 or 4 may be arranged, as recited in claim 6, such that the color filters are Bayer-arranged with red, green, and blue primary colors, and the signals generated by the output unit represent brightness Y and color difference signals C1 and C2.

The solid-state image sensor according to claim 6 may be arranged, as recited in claim 7, such that the color difference signals C1 and C2 generated by the signal processor is smaller in number than signals representing the brightness Y.

The solid-state image sensor according to claim 6 or 7 may be arranged, as recited in claim 8, such that the signal processor suppresses false color when at least one of the color difference signals C1 and C2 is generated.

The solid-state image sensor according to any one of claims 1 to 8 may be arranged, as recited in claim 9, such that the solid-state image sensor further includes a variable gain amplifier which varies the intensities of the analog signals output from the photoelectric conversion elements, for each of the plural colors, wherein, by the variable gain amplifier, white balance of colors of an image taken by using the solid-state image sensor is adjustable. This makes it possible to improve the convenience.

The solid-state image sensor according to any one of claims 1 to 9 may be arranged, as recited in claim 10, such that the solid-state image sensor further includes a switching unit which switches between a first output mode in which the plural digital signals are mixed up and then output from the signal output unit and a second output mode in which digital signals of the respective photoelectric conversion elements are output without being mixed up. It is therefore possible to easily switch the data rate and resolution when image data is read out from the solid-state image sensor.

An imaging apparatus includes: an image capture optical system which introduces light and forms a subject image in a solid-state image sensor; a solid-state image sensor which photo-electrically converts the subject image into signals and outputs the signals; and an image processing unit which conducts predetermined image processing on the signals output from the solid-state image sensor so as to reproduce the subject image, wherein, the solid-state image sensor is identical with the solid-state image sensor of any one of claims 1 to 10.

Since the imaging apparatus is provided with the solid-state image sensor of any one of claims 1 to 10, it is possible to reduce the pixel rate of pixel signals read out from the solid-state image sensor, while restraining the reduction in the angle of view and the deterioration of image quality. It is also possible to effectively use a Bayer-arranged solid-state image sensor of RGB primary colors.

In addition to the above, since the imaging apparatus includes a solid-state image sensor capable of adjusting white balance, the image quality is further improved.

The imaging apparatus includes in the solid-state image sensor a switching unit which switches between a first output mode in which the plural digital signals are mixed up and then output a second output mode in which digital signals of the respective photoelectric conversion elements are output without being mixed up. It is therefore possible to easily switch the data rate and resolution.

The imaging apparatus includes: an image capture optical system which introduces light and forms a subject image in a solid-state image sensor; a solid-state image sensor which photo-electrically converts the subject image into signals and outputs the signals; and an image processing unit which conducts predetermined image processing on the signals output from the solid-state image sensor so as to reproduce the subject image, wherein, the solid-state image sensor is identical with the solid-state image sensor of any one of claims 4 to 10, and the image processing unit reproduces the subject image from plural frames.

The imaging apparatus is arranged so that the solid-state image sensor of any one of claims 4 to 10 is provided and the image processing unit is arranged to reproduce the subject image from plural frames. It is therefore possible in the image processing to generate a high-quality image from plural frames.

The solid-state image sensor of the present invention can reduce the pixel rate while restraining the reduction in the angle of view and the deterioration in image quality when image data is output from the image sensor, because the signal output unit is provided to mix up plural digital signals, which are output via the A/D converter, at predetermined sampling positions and at predetermined different rates, and outputs signals which are smaller in number than the photoelectric conversion elements, and sampling gravity centers of the signals output from the signal output unit are at equal intervals.

The solid-state image sensor of the present invention can reproduce the subject image by known image processing without changing the RGB pixel intervals, in such a way that the color filters are Bayer-arranged with RGB primary colors and the signals generated by the signal output unit are also Bayer-arranged with RGB primary colors.

In addition to the above, the solid-state image sensor of the present invention can further restrain the deterioration in image quality because the signal processor can generate output signals of Cy (cyan), Ye (yellow), G (green), Mg (magenta) and the like and generate output signals of brightness Y, color difference signals C1 and C2 and the like by mixing up optical outputs of plural different colors.

In addition to the above, the solid-state image sensor of the present invention can generate in image processing a high-quality image from plural frames, because the signal processor is arranged to be able to differentiate, in each frame, a mixture rate of the optical outputs having the plural different colors, even at identical sampling positions.

In addition to the above, the solid-state image sensor of the present invention is convenient because a variable gain amplifier which can vary the intensities of the analog signals output from the photoelectric conversion elements in accordance with each of the plural colors, and white balance of colors of an image is adjustable by the variable gain amplifier.

In addition to the above, the solid-state image sensor of the present invention can easily switch the data rate and resolution because it is provided with a switching unit which switches between a first output mode in which the plural digital signals are mixed up and then output a second output mode in which digital signals of the respective photoelectric conversion elements are output without being mixed up. It is therefore possible to easily switch the data rate and resolution.

In addition to the above, the imaging apparatus of the present invention includes the solid-state image sensor which can reduce the pixel rate of pixel signals read out from the solid-state image sensor, while restraining the reduction in the angle of view and the deterioration of image quality. It is therefore possible in moving image capture to restrain the deterioration in image quality with an improved frame rate.

In addition to the above, the imaging apparatus of the present invention includes in the solid-state image sensor a switching unit which switches between a first output mode in which the plural digital signals are mixed up and then output a second output mode in which digital signals of the respective photoelectric conversion elements are output without being mixed up. It is therefore possible to select a preferable output mode of the image sensor in accordance with the switching between still image capture and moving image capture, and hence suitable resolution and output data rate are obtained.

In addition to the above, the imaging apparatus of the present invention may be arranged so that the signal processor of the solid-state image sensor can differentiate, in each frame, a mixture rate of the optical outputs having the plural different colors, even at identical sampling positions. This makes it possible to generate a high-quality image from plural frames in image processing.

REFERENCE NUMERALS

10 IMAGE CAPTURE OPTICAL SYSTEM
20 SOLID-STATE IMAGE SENSOR
21 PHOTOELECTRIC CONVERSION ELEMENT (LIGHT RECEIVING ELEMENT)
22 A/D CONVERTER
23 SIGNAL OUTPUT UNIT
24 IMAGE PROCESSOR
25 OUTPUT UNIT
30 IMAGE PROCESSING CHIP

BEST MODE FOR CARRYING OUT THE INVENTION

First Embodiment

Now, a solid-state image sensor and an imaging apparatus according to First Embodiment of the present invention will be described with reference to figures.

Figure 1:
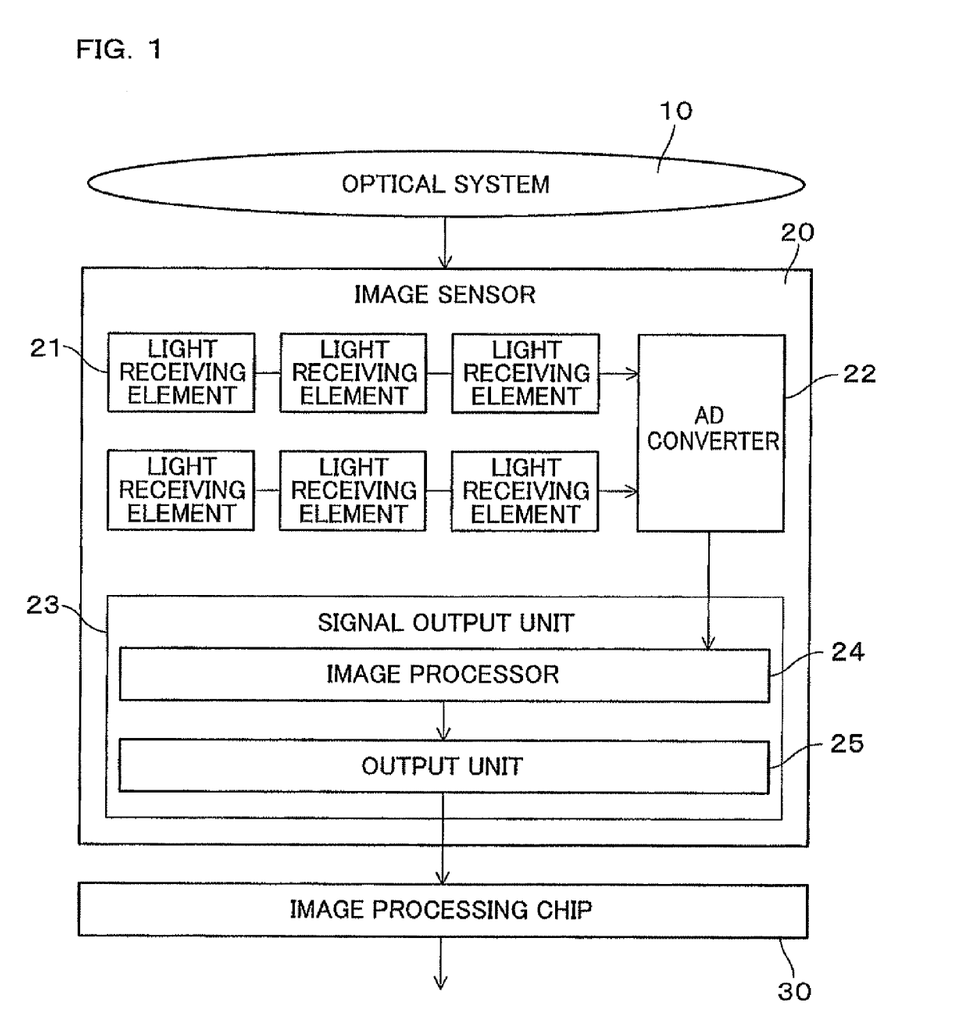
FIG. 1 is a block diagram of an imaging apparatus 1 of First Embodiment, which adopts the solid-state image sensor and the imaging apparatus of the present invention.

FIG. 1 is a block diagram of an imaging apparatus 1 of First Embodiment, which adopts the solid-state image sensor and the imaging apparatus of the present invention. FIG. 2 illustrates a signal output process in the solid-state image sensor according to First Embodiment.

As shown in FIG. 1, the imaging apparatus 1 is constituted by: an image capture optical system 10 which introduces light and forms a subject image on a solid-state image sensor 20; the solid-state image sensor 20 which carries out photoelectric conversion of the formed subject image and outputs the image; and an image processing chip 30 which performs predetermined processing on the output signal from the solid-state image sensor 20 so as to reproduce the subject image.

The solid-state image sensor 20 includes: plural photoelectric conversion elements (light receiving elements) 21 which form a grid pattern and output analog signals in accordance with amounts of light received; an A/D converter which quantizes the analog signals output from the photoelectric conversion elements to digital signals and outputs the digital signals; and a signal output unit 23 which mixes up the digital signals output via the A/D converter 22 at predetermined sampling positions and at predetermined different rates, so as to output signals which are smaller in number than the photoelectric conversion elements.

The plural photoelectric conversion elements 21 are respectively provided with color filters which allow different color components to pass through, and the color filters are arranged so that groups of pixels each group including plural pixels of different colors are cyclically provided.

The solid-state image sensor 20 is a single-chip image sensor in which plural photoelectric conversion elements 21 are provided in a matrix manner. On the front surface of the solid-state image sensor 20 is provided Bayer-arranged color filters (see FIG. 2(a)) of R (red), G (green), and B (blue) primary colors to correspond to the photoelectric conversion elements. The image sensor 20 is arranged to convert an amount of single-color light having passed through each of the filters of respective colors into an analog electric signal.

Figure 2A:
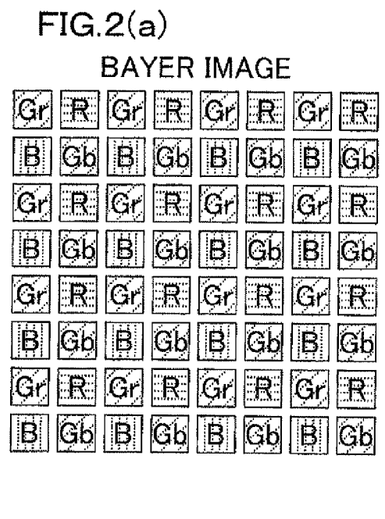
FIG. 2 illustrates a signal output unit in the solid-state image sensor of First Embodiment.
Figure 2B:
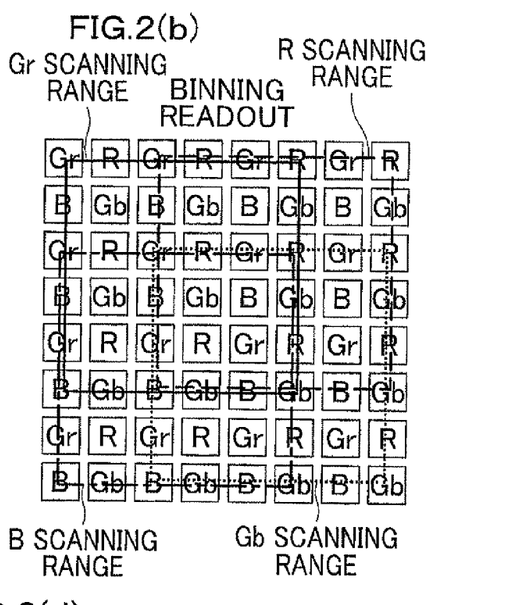

More specifically, as shown in FIG. 2(a), in the aforesaid primary-color Bayer arrangement, G filters are disposed in a checkerboard pattern, and a row in which G filters and R filters are alternated and a row in which G filters and B filters are alternated are alternated. In the present embodiment, G colors on the same horizontal lines as R colors are termed Gr, whereas G colors on the same horizontal lines as B colors are termed Gb, as shown in FIG. 2(a).

In the present embodiment, the solid-state image sensor 20 is constituted by 8 megapixels. (This is equivalent to the number of photoelectric conversion elements 21.) This image sensor 20 outputs signals from 8 megapixels when capturing still images. When capturing moving images, the image sensor 20 outputs signals from 2 megapixels required for HD moving image capture, by halving the number of pixels in both the vertical and horizontal directions.

The electric signals output from the photoelectric conversion elements 21 are converted to digital signals by the A/D converter 22, and are then output as original RAW data to a signal processor 23.

The signal processor 23 is constituted by: an image processor 24 which generates output signals by decimating the RAW data; and an output unit 25 which outputs, to the image processing chip 30, the output signal generated by the image processor 24.

The image processor 24 receives the RAW data, and applies a low-pass filter to each of R, Gr, Gb, and B pixels and vertically and horizontally halves the pixel data. The image processor 24 then sends the data to the signal output unit.

Figure 5A:
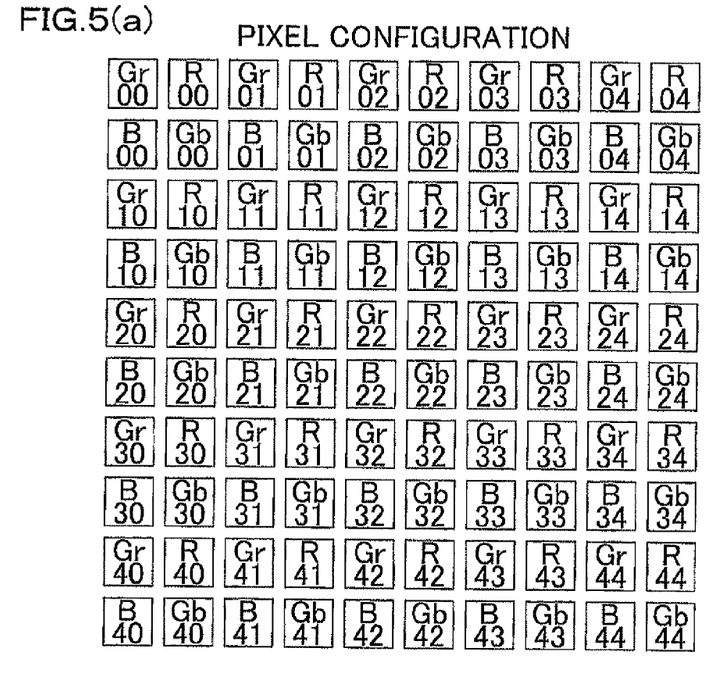
FIG. 5 shows Bayer-arranged pixels of the present embodiment.

For example, provided that the reduction rate of the image in one direction is ½, a low-pass filter whose cutoff frequency is fs/4((fs/2)×(½)) can be used. This case assumes that, as shown in FIG. 5(a), numbers are allocated to the pixels in accordance with the Bayer arrangement.

Figures 2C, 2D:
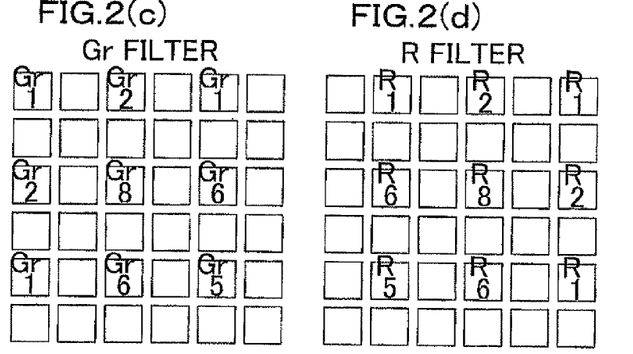

First, to generate a Gr signal, pixels within a 6×6 pixel range starting from a pixel Gr00 are subjected to the filter of FIG. 2(c).

More specifically, the Gr output signal is calculated by a calculation formula (Gr00×1+Gr01×2+Gr02×1+Gr10×2+Gr11×8+Gr12×6+Gr20×1+Gr21×6+Gr22×5)/32. In this regard, the coefficient of the filter is arranged so that the gravity center locates at the center of the 6×6 pixel range starting from a pixel Gr00, and the filter is a high-cut filter restraining aliasing. In the present embodiment, low-definition pixels are sampled from a high-definition original image. In so doing, when the original image includes a high frequency (which is not lower than Nyquist frequency) which cannot be represented in the reduced image, the reduced image becomes dark. Taking this problem into consideration, the reduced image in the present embodiment is arranged to be bright enough because the image before the reduction is smoothed by a high-cut filter.

Thereafter, to generate an R signal, the scanning range is shifted rightward by two pixels in comparison to the case of Gr signal, and pixels within a 6×6 pixel range starting from a pixel Gr01 are subjected to the filter of FIG. 2(d).

More specifically, the R output signal is calculated by a calculation formula (R01×1+R02×2+R03×1+R11×6+R12×8+R13×2+R21×5+R22×6+R23×1)/32. In this regard, the coefficient of the filter is arranged so that the gravity center locates at the center of the 6×6 pixel range starting from a pixel Gr01, and the filter is a high-cut filter restraining aliasing.

Figures 2E, 2F:
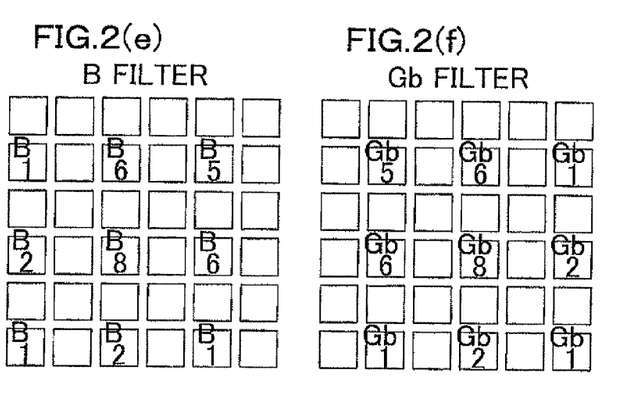

Thereafter, to generate a Gb signal, the scanning range is shifted downward by two pixels in comparison to the case of R signal, and pixels within a 6×6 pixel range starting from a pixel Gr11 are subjected to the filter of FIG. 2(f).

More specifically, the Gb output signal is calculated by a calculation formula (Gb11×5+Gb12×6+Gb13×1+Gb21×6+Gb22×8+Gb23×2+Gb31×1+Gb32×2+Gb33×1)/32. In this regard, the coefficient of the filter is arranged so that the gravity center locates at the center of the 6×6 pixel range starting from a pixel Gr11, and the filter is a high-cut filter restraining aliasing.

Figure 3A:
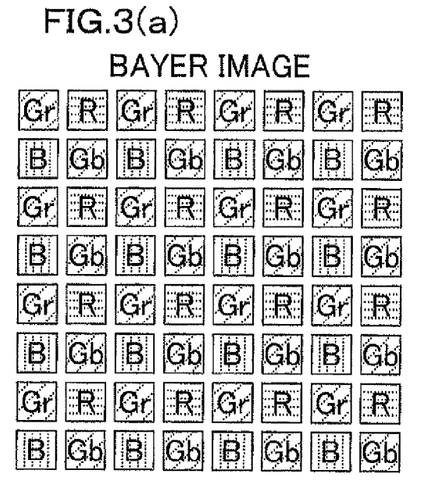
FIG. 3 illustrates the operation of a signal output unit of Second Embodiment, which adopts the solid-state image sensor and the imaging apparatus of the present invention.
Figure 3B:
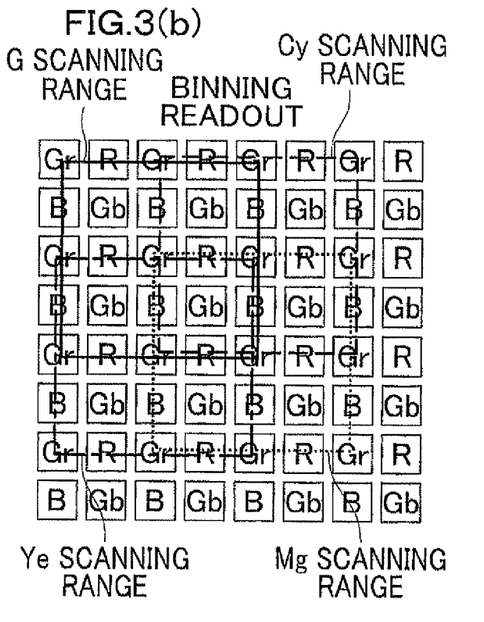
Figure 3C:
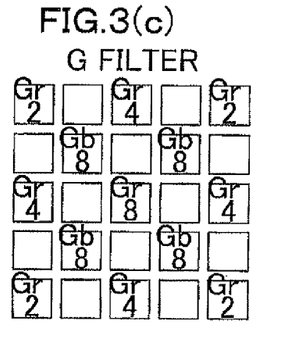
Figure 3D:
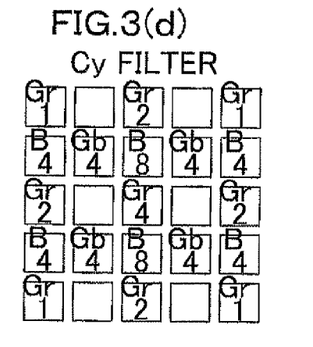
Figure 3E:
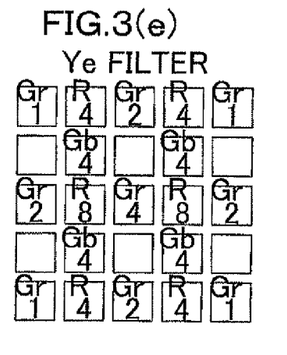
Figure 3F:
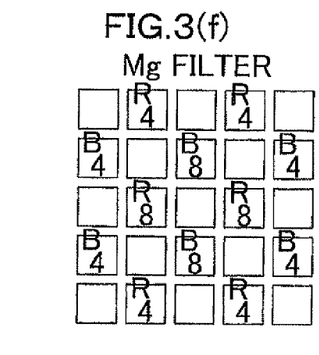

Thereafter, to generate a B signal, the scanning range is shifted downward by two pixels in comparison to the case of Gr signal, and pixels within a 6×6 pixel range starting from a pixel Gr10 are subjected to the filter of FIG. 3(e).

More specifically, the B output signal is calculated by a calculation formula (B10×1+B11×6+B12×5+B20×2+B21×8+B22×6+B30×1+B31×2+B32×1)/32. In this regard, the coefficient of the filter is arranged so that the gravity center locates at the center of the 6×6 pixel range starting from a pixel Gr10, and the filter is a high-cut filter restraining aliasing.

Figure 2G:
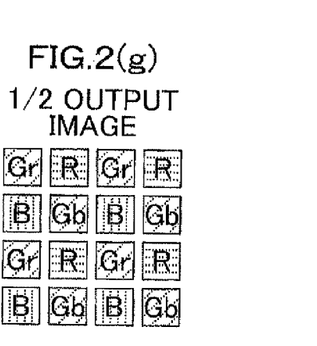

These processes are repeatedly carried out while shifting the target pixels by four pixels both vertically and horizontally As a result, as shown in FIG. 2(g), the image data which is reduced to ½ in vertical and horizontal directions is output while keeping the original Bayer arrangement, and hence image deterioration is restrained when a color image is generated by the image processing chip 25 on the subsequent stage. In other words, it is possible to obtain, from the signal output unit 23, output signals whose sampling gravity centers are at equal intervals.

Subsequently, the image processing chip 30 generates a color image from the image data output from the solid-state image sensor 20.

To put it differently, while each pixel of a single-chip image sensor only have monochrome color information, color image display requires each pixel to have all of red (R), green (G), and blue (B) values. For this reason, image processing using a single-chip image sensor includes a publicly-known demosaicing process which is carried out based on a color mosaic image in which each pixel has only one of R, G, and B components. The demosaicing process (i.e. so-called color interpolation) is arranged so that an interpolation calculation is carried out using brightness information of colors which are not included in monochrome color information of each pixel of the color mosaic image and are collected from surrounding pixels, so that a color image in which each pixel has all of R, G, and B components is generated.

As described above, the solid-state image sensor 20 and the imaging apparatus of First Embodiment include a signal output unit which mixes up plural digital signals output via the A/D converter at predetermined sampling positions and at predetermined different rates, so as to output signals which are smaller in number than the photoelectric conversion elements. Furthermore, the sampling gravity centers of the output signals output from the signal output unit are at equal intervals. It is possible to reduce the pixel rate while restraining the reduction in the angle of view and the deterioration of image quality when image data is output from the image sensor. Furthermore, the color filters are Bayer-arranged color filters of R, G, and B primary colors, and the output signals generated by the signal processor are also Bayer-arranged and have R, G, and B primary colors. For this reason, a subject image with less image deterioration is generated by using an image processing chip 30 which is similar to the image processing chip which processes original RAW data.

In regard to the filtering in the signal processor, the coefficient of the filter may be changed in consideration of the strength of the low-pass filter and the operation of the image processing chip 30.

Second Embodiment

Now, Second Embodiment of the present invention will be described with reference to FIG. 3. FIG. 3 illustrates image processing in the solid-state image sensor according to the present invention.

A solid-state image sensor and an imaging apparatus of Second Embodiment are basically identical with those of First Embodiment except the operation of the image processor 24. The following will therefore focus on characteristic arrangements and not detail the shared arrangements.

As shown in FIG. 3, the image processor 24 of Second Embodiment outputs signals whose number is ½ of the total number of pixels, in the CYGM complementary format. In this case, pixel signals output from the respective photoelectric conversion elements 21 of the solid-state image sensor are Bayer-arranged as shown in FIG. 5(a), and this output is supplied to the image processor 24 as original RAW data of the A/D converter 22.

Receiving the RAW data, the image processor 24 mixes up the pixel signals of different colors, applies the low-pass filter, and vertically and horizontally halves the pixel data by decimation. The image processor 24 generates output signals this way.

For example, provided that the reduction rate of the image in one direction is ½, a low-pass filter whose cutoff frequency is fs/4((fs/2)×(½)) can be used. This case assumes that, as shown in FIG. 5(a), numbers are allocated to pixels in accordance with the Bayer arrangement.

First, to generate a G signal, pixels within a 5×5 pixel range starting from a pixel Gr00 are subjected to the filter of FIG. 3(c).

More specifically, the G output signal is calculated by a calculation formula (Gr00×2+Gr01×4+Gr02×2+Gb00×8+ Gb01×8+Gr10×4+Gr11×8+Gr12×4+Gb10×8+Gb11×8+ Gr20×2+Gr21×4+Gr22×2)/64.

Thereafter, to generate a Cy signal, the scanning range is shifted rightward by two pixels in comparison to the case of G signal, and pixels within a 5×5 pixel range starting from a pixel Gr01 are subjected to the filter of FIG. 3(d).

More specifically, the Cy output signal is calculated by a calculation formula (Gr01×1+Gr02×2+Gr03×1+B01×4+ Gb01×4+B02×8+Gb02×4+B03×4+Gr11×2+Gr12×4+ Gr13×2+B11×4+Gb11+4+B12×8+Gb12×4+B13×4+Gr21× 1+Gr22×2+Gr23×1)/64.

Thereafter, to generate a Ye signal, the scanning range is shifted downward by two pixels in comparison to the case of G signal, and pixels within a 5×5 pixel range starting from a pixel Gr10 are subjected to the filter of FIG. 3(e).

More specifically, the Ye output signal is calculated by a calculation formula (Gr10×1+R10×4+Gr11×2+R11×4+ Gr12×1+Gb10×4+Gb11×4+Gr20×2+R20×8+Gr21×4+ R21×8+Gr22×2+Gb20×4+Gb21×4+Gr30×1+R30×4+ Gr31×2+R31×4+Gr32×1)/64.

Figure 3G:
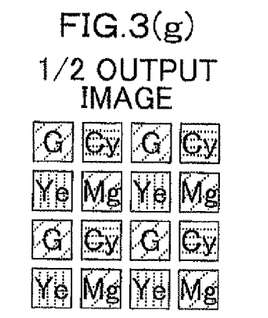

Thereafter, to generate a Mg signal, the scanning range is shifted rightward by two pixels in comparison to the case of Ye signal, and pixels within a 5×5 pixel range starting from a pixel Gr11 are subjected to the filter of FIG. 3(g).

More specifically, the Mg output signal is calculated by a calculation formula (R11×4+R12×4+B11×4+B12×8+B13× 4+R21×8+R22×8+B21×4+B22×8+B23×4+R31×4+R32×4)/ 64.

By the calculation formulas above, the filtering is carried out to generate CYGM arrangements at intervals of two pixels. Since the sampling gravity centers are arranged at equal intervals after these processes are repeatedly carried out while shifting the target pixels by four pixels both vertically and horizontally, it is possible to restrain the reduction in the resolution on account of pixel decimation. In regard to the filtering, the strength of the low-pass filter may be changed and the coefficient of the filter may be changed according to need.

Thereafter, the RAW data reduced by the image processor is output to the image processing chip 30. The image processing chip 30 conducts a publicly-known demosaicing process based on color complementary, so that a color image is generated.

In addition to the above, in case of moving image capture, the image processor may change the way of pixel mixture in each frame.

Figure 6A:
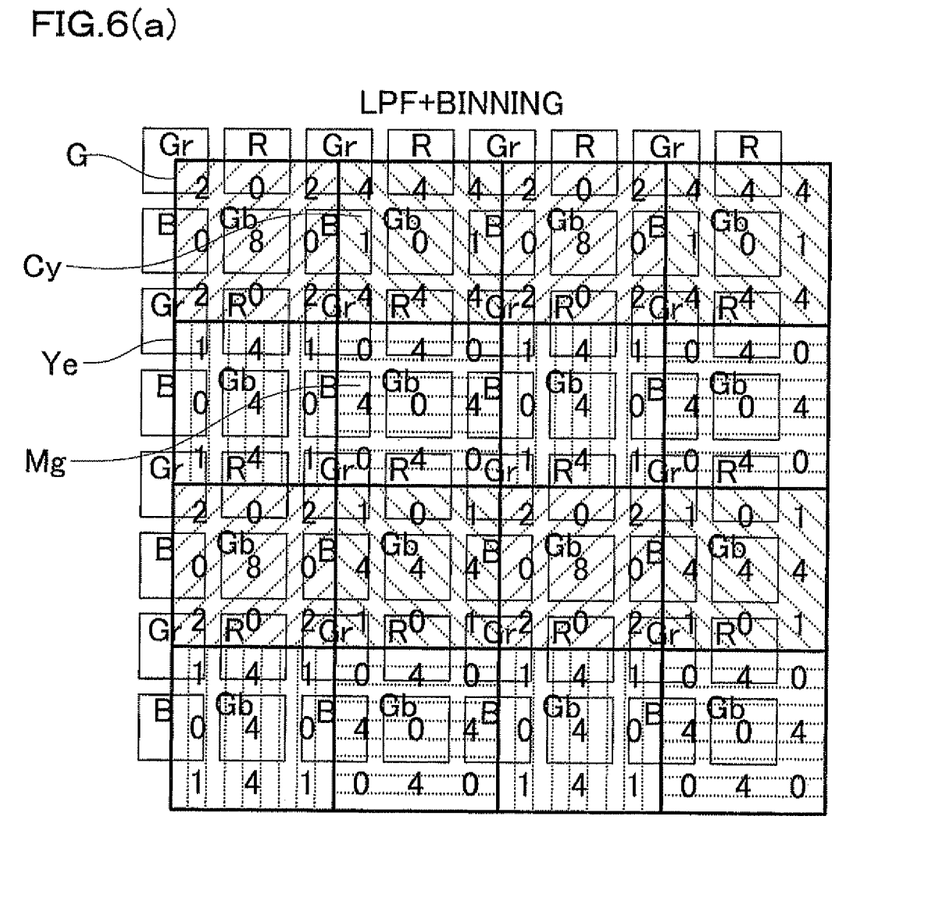
FIG. 6 illustrates pixel mixture in odd frames in the solid-state image sensor of Second Embodiment.
Figure 6B:
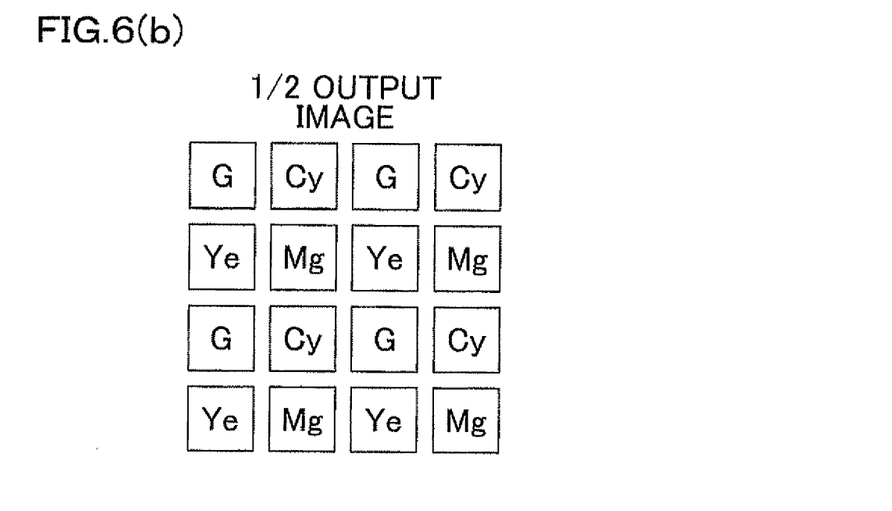
Figure 7A:
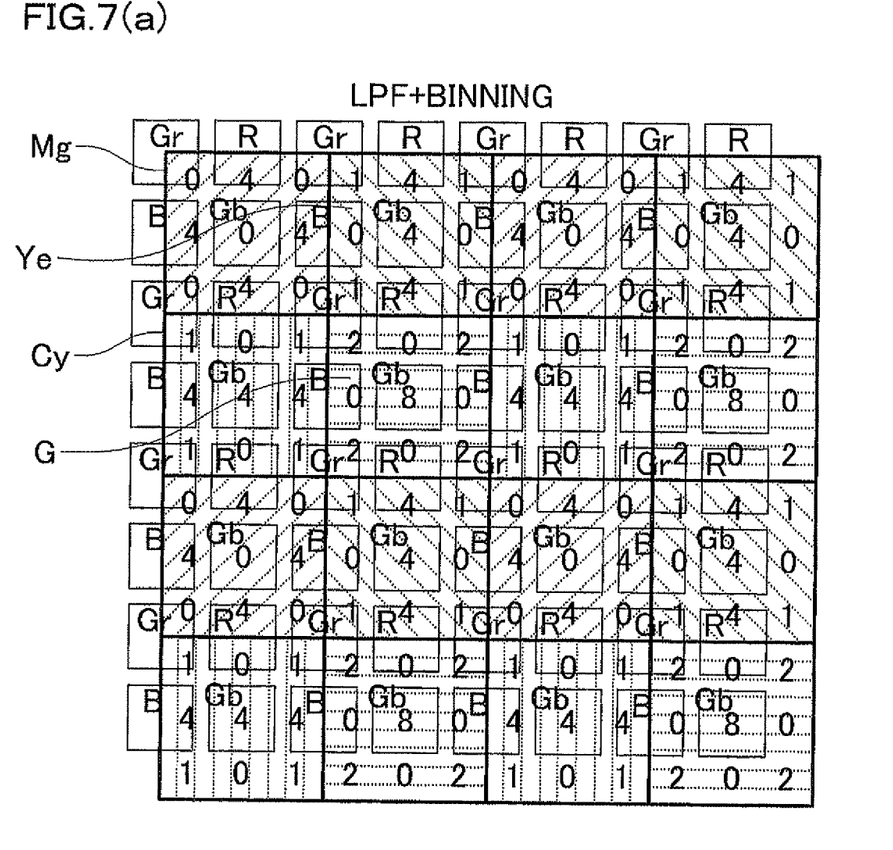
FIG. 7 illustrates pixel mixture in even frames in the solid-state image sensor of Second Embodiment.
Figure 7B:
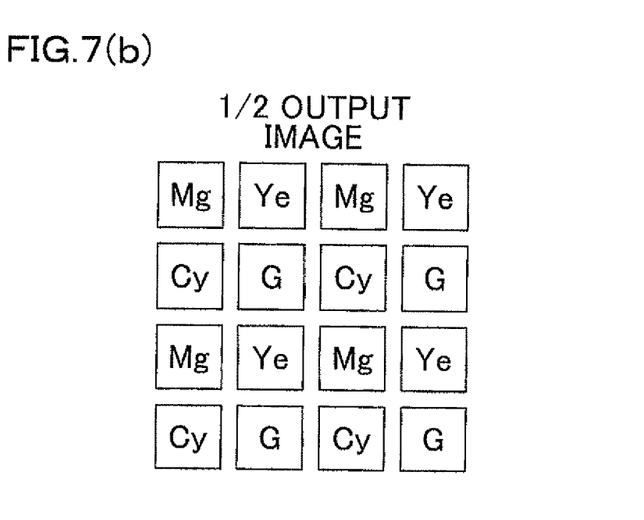
Figure 8A:
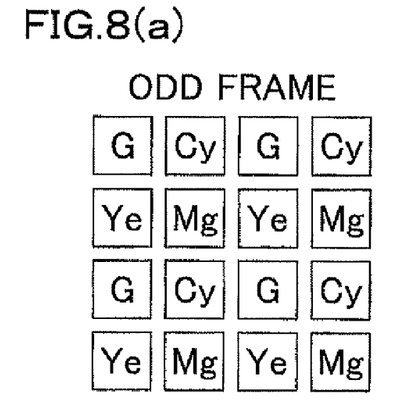
FIG. 8 illustrates three-dimensional YC separation in an image processing chip of Second Embodiment.
Figure 8B:
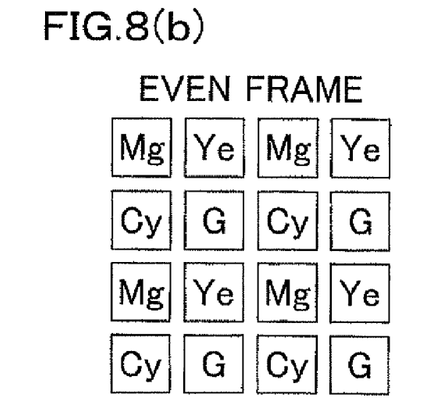
Figure 8C:
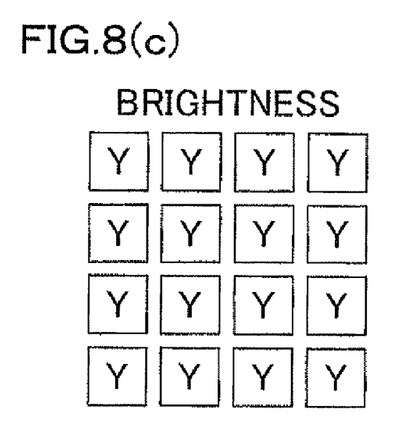
Figure 8D:
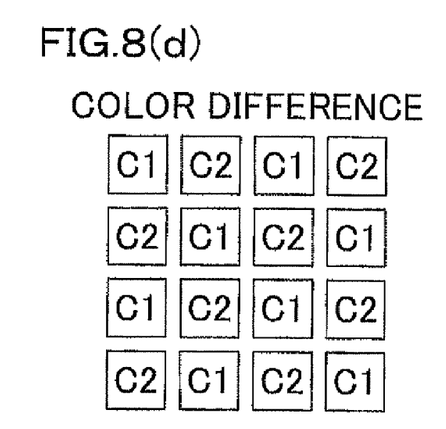

For example, as shown in FIG. 6(a), in odd frames, a filter having the numbers shown in the figure in a 3×3 pixel range is applied to each Gb pixel and its surroundings pixels, so that decimation output is carried out as shown in FIG. 6(b). The filters indicated by G, Cy, Ye, and Mg, respectively, mix different-colored pixel signals at different rates, and the decimation output generates CYGM arrangements at intervals of two pixels. In even frames, the filter for G is swapped with the Mg filter and the Cy filter is swapped with the Ye filter as shown in FIG. 7(a), and decimation output is conducted as shown in FIG. 7(b).

In so doing, the image processing chip 30 generates a color image using so-called three-dimensional YC separation as shown in FIG. 8. More specifically, receiving an n-th frame Fn, the image processing chip 30 figures out an average between the frame Fn and the directly-preceding frame Fn−1, so as to generate a brightness signal Y=(Gr+Gb+R+B)/2 for all output pixels.

Furthermore, by calculating a difference between the frame Fn and the directly-preceding frame Fn−1, a first color difference C1=(G−Mg)=(Gr+Gb−R−B)/2 at G and Mg pixels and a second color difference C2=(Cy−Ye)=(B−R)/2 at Cy and Ye pixels are obtained, and a color image is generated therefrom and output.

In this way, a high-quality image is generated for a subject with little movement. In addition to the above, the image processing chip 30 may switch between image formation from a single frame and image formation by the three-dimensional YC separation, in accordance with the degree of movement of the subject.

Third Embodiment

Now, Third Embodiment of the present invention will be described with reference to FIG. 4. FIG. 4 illustrates image processing by a solid-state image sensor of the present invention.

A solid-state image sensor and an imaging apparatus of Third Embodiment are basically identical with those of First Embodiment except the operation of the image processor 24. The following will therefore focus on characteristic arrangements and not detail the shared arrangements.

As shown in FIG. 4, an image processor 24 of Third Embodiment outputs signals whose number is ½ of the total number of pixels, in the YCC format (i.e. the image processor 24 outputs brightness Y and two color differences C1 and C2). This output is done with a sampling format of 4:2:2.

Figure 5B:
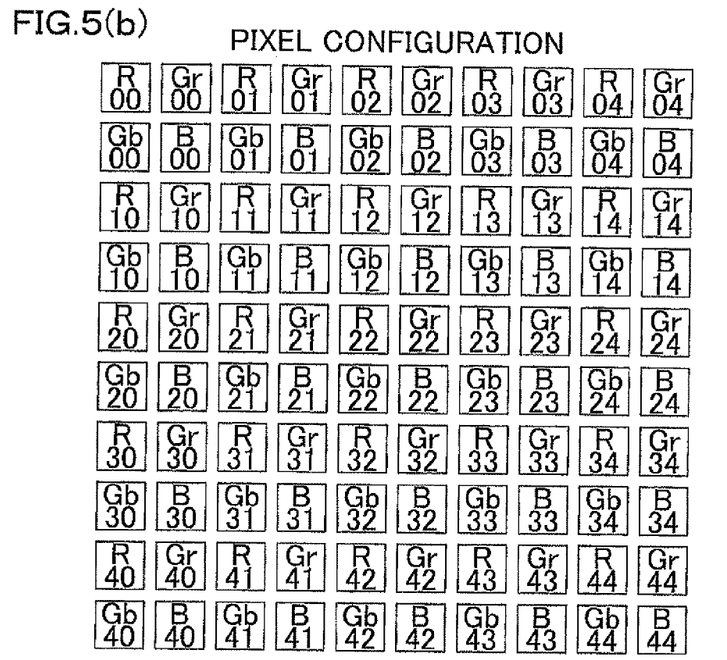

In the present embodiment, the pixels output from the respective photoelectric conversion elements 21 of the solid-state image sensor are Bayer-arranged as shown in FIG. 5(b). The pixels are output as original RAW data of the A/D converter 22 to the image processor 24. Preferably, a variable gain amplifier is provided for each color, and an output signal of the photoelectric conversion element 21 is adjusted before AD conversion by the A/D converter 22 so that white balance is achieved.

First, to generate a Y signal, pixels within a 3×3 pixel range starting from a pixel B00 are subjected to the filter of FIG. 4(*c*). In this case, as shown in FIG. 5(*b*), numbers are allocated to the respective pixels in accordance with the Bayer arrangement.

Figure 4A:
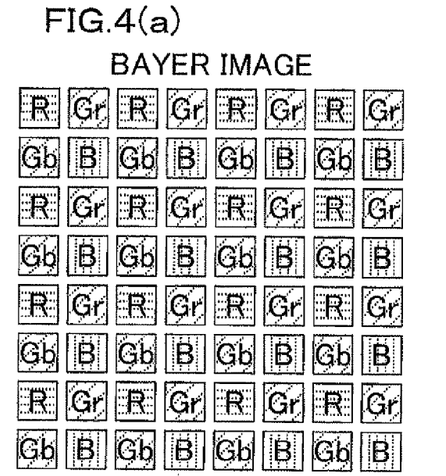
FIG. 4 illustrates the operation of a signal output unit of Third Embodiment, which adopts the solid-state image sensor and the imaging apparatus of the present invention.
Figure 4B:
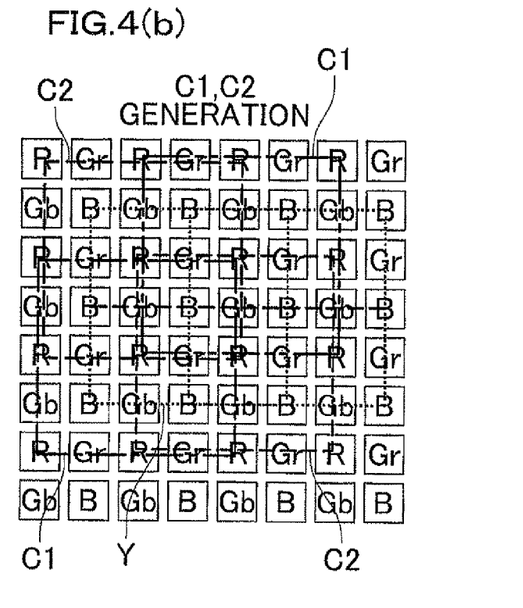
Figure 4C:
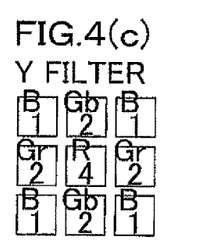

More specifically, a Y output signal is calculated by a calculation formula (B00×1+Gb01×2+B01×1+Gr10×2+ R11×4+Gr11×2+B10×1+Gb11×2+B11×1)/16. The sampling gravity center of this signal is at R11. This calculation formula indicates a low-pass filter whose cutoff frequency is fs/2 (Nyquist frequency), and the generated signal Y has a mixture rate of R:G:B=1:2:1.

Thereafter, to generate a C2 signal, pixels within a 5×5 pixel range starting from a pixel R00 are subjected to the filter of FIG. 4(*d*).

Figure 4D:
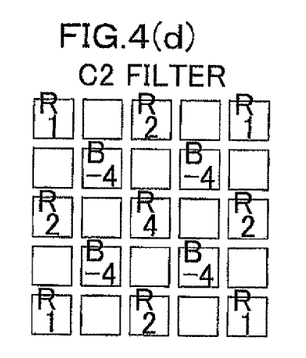

More specifically, a C2 output signal is calculated by a calculation formula (R00×1+R01×2+R02×1+B00×(−4)+ B01×(−4)+R10×2+R11×4+R12×2+B10×(−4)+B11×(−4)+ R20×1+R21×2+R22×1)/32. The sampling gravity center of this signal is at R11. This filter is equivalent to a difference between R and B after the filter of fs/4 is applied to R and B, and the mixture rate of the signal C2 is R:G:B=1:0:(−1).

Thereafter, for the generation of Y, a Y output signal whose sampling gravity center is at R12 is generated by applying a filter of FIG. 4(*c*) to pixels within a 3×3 pixel range starting from a pixel B01. Thereafter, to generate a C1 signal, pixels within a 5×5 pixel range starting from a pixel R01 are subjected to the filter of FIG. 4(*e*).

Figure 4E:
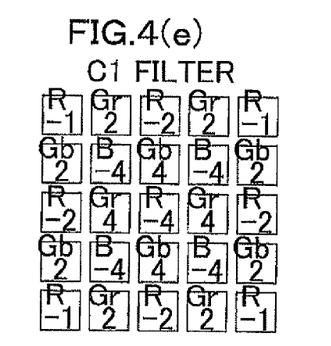
Figure 4F:
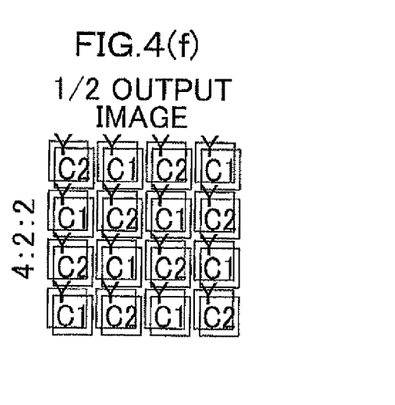
Figure 4G:
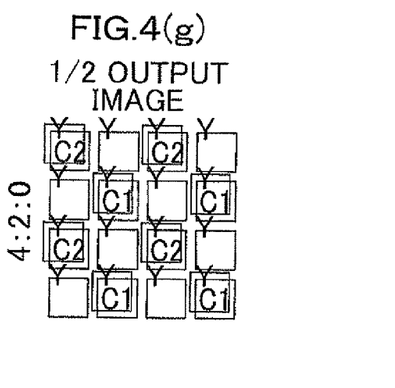

More specifically, a C1 output signal is generated by a calculation formula (R01×(−1)+Gr01×2+R02×(−2)+Gr02× 2+R03×(−1)+Gb01×2+B01×(−4)+Gb02×4+B02×(−4)+ Gb03×2+R11×(−2)+Gr11×4+R12×(−4)+Gr12×4+R13×(− 2)+Gb11×2+B11×(−4)+Gb12×4+B12×(−4)+Gb13×2+ R21×(−1)+Gr21×2+R22×(−2)+Gr22×2+R23×(−1))/32. The sampling gravity center of this signal is at R12. This filter is equivalent to a difference between (Gr+GB) and (R+B) after each of R, Gr, Gb, and B is subjected to the filter fs/4, and the mixture rate of the signal C1 is R:G:B=(−1):2:(−1).

As these processes are repeatedly carried out while shifting the target pixels by two pixels vertically and by four pixels horizontally, as shown in FIG. 4(*f*), an image of ½ output, which has a mixture rate of Y:C1:C2=4:2:2, is generated from brightness Y which is generated by decimation with intervals of vertical two pixels and horizontal two pixels and signals C1 and C2 which are generated by decimation with intervals of vertical two pixels and horizontal four pixels.

In regard to the filtering by the signal processor, the strength of the low-pass filter may be adjusted and the filter coefficient may be changed. It is preferable that the low-pass filter for brightness is weaker than that for color difference, and the low-pass filter for color difference is stronger than that of brightness.

As described above, according to Third Embodiment, the number of pixels is reduced to ¼ in the output format of YCC 4:2:2. In so doing, provided that color difference information is included, information of a single pixel is represented by two values, and a single value is represented by 12 bits, 24 bits are required for information of a single pixel. Information output for 2-megapixel moving image is 24 bit×2 Mpixel×60 fps=2.88 Gbps, and hence the bandwidth is restrained to ½.

As shown in FIG. 4(*g*), a sampling format of YCC=4:2:0 is obtained by setting intervals of decimation of color difference in the image processor 23 at vertical four pixels and horizontal four pixels. In this case, an average amount of data for one pixel is 18 bits, and hence an amount of information output for 2-megapixel moving image is 18 bit×2 Mpixel×60 fps=2.16 Gbps. As such, the bandwidth is restrained to ⅜.

Subsequently, the image processing chip 30 carries out color conversion from YCC which is output from the solid-state image sensor to standard RGB or YCbCr (ITU-R (International Telecommunication Union-Radio communication Sector) BT.601), with the result that a color image is generated.

As described above, according to Third Embodiment, output signals of brightness Y and color differences C1 and C2 whose sampling gravity centers are at equal intervals are obtained from the Bayer arrangement of three primary colors. This makes it possible to reduce the output data rate and to obtain the brightness Y for all output pixels, with the result that a high-definition image is obtained.

In addition to the above, false color suppression may be carried out when color difference signals C1 and C2 are generated. As an example, false color suppression of red and blue false colors on C2 will be described. The Bayer-arranged color image sensors of the solid-state image sensor 20 often involve red and blue false colors at around the Nyquist frequency. Such a stripe pattern is detectable by calculating a difference between Gr and Gb, and it is therefore possible to suppress false colors.

More specifically, as described above, C2 is calculated by a calculation formula C2=(R00×1+R01×2+R02×1+B00×(− 4)+B01×(−4)+R10×2+R11×4+R12×2+B10×(−4)+B11×(− 4)+R20×1+R21×2+R22×1)/32.

Subsequently, a high frequency component K is calculated by a calculation formula K=((Gr00×1+Gr10×2+Gr20×1+ Gr01×1+Gr11×2+Gr21×1)−(Gb00×1+Gb01×2+Gb02×1+ Gb10×1+Gb11×2+Gb12×1))/16.

Thereafter, the absolute value of K2 is subtracted from the absolute value of C2 by using the calculation formula below (unless it goes across zero).

$$C2 \rightarrow \text{sign}(C2)\max(abs(C2)-abs(K),0)$$

Embodiments of the present invention have been described above. Since the present invention is not limited to Embodiments above, the shapes of the filters in the image processor 24, the output format of the data from the signal output unit 25 and the like may be variously altered.

The present invention may be used for mixing signals at predetermined sampling positions with predetermined different rates to output signals which are smaller in number than photoelectric conversion elements.

The invention claimed is:

1. A solid-state image sensor comprising:
   plural photoelectric conversion elements which form a grid pattern and output analog signals in accordance with amounts of received light; and
   an A/D converter which quantizes the analog signals output from the photoelectric conversion elements into digital signals and outputs the digital signals, wherein,
   the photoelectric conversion elements respectively have color filters which allow different color components to pass through, and the color filters are Bayer-arranged with red, green, and blue primary colors and divided into plural groups each including color filters of plural colors, the groups being cyclically provided,
   a signal output unit is further provided to mix up for each of the red, blue, and green colors the digital signals, which are output via the A/D converter, at predetermined sampling positions and at predetermined different rates, and outputs signals which are smaller in number than the photoelectric conversion elements and are Bayer-arranged, in regard to the digital signals output via the A/D converter, for each of predetermined square regions in each of which plural Bayer-arranged unit regions of two rows and two columns are provided and the red, blue, and green colors are identical with one another in terms of size, with reference to plural pixel values of that predetermined square region, the signal output unit multiplies the referred pixel values by weighting factors, calculates a sum of values resulting from multiplication, and divides the sum of values by a sum of the weighting factors, and a value calculated by division is output as a single pixel value, and sampling gravity centers each of which is a gravity center of the weighting factors of the predetermined square region are positioned at centers of the predetermined square regions, and are at equal intervals in both vertical and horizontal directions, and the intervals in the vertical direction are identical with the intervals in the horizontal direction.

2. A solid-state image sensor comprising:

plural photoelectric conversion elements which form a grid pattern and output analog signals in accordance with amounts of received light; and an A/D converter which quantizes the analog signals output from the photoelectric conversion elements into digital signals and outputs the digital signals, wherein, the photoelectric conversion elements respectively have color filters which allow different color components to pass through, and the color filters are Bayer-arranged with red, green, and blue primary colors and divided into plural groups each including color filters of plural colors, the groups being cyclically provided, a signal output unit is further provided to mix up in at least one of the red, blue, and green colors the digital signals, which are output via the A/D converter, at predetermined sampling positions and at predetermined different rates, and outputs signals which are smaller in number than the photoelectric conversion elements and are in an arrangement constituted by cyan, yellow, green, and magenta, in regard to the digital signals output via the A/D converter, for each of predetermined square regions each having plural rows and plural columns, with reference to plural pixel values of that predetermined square region, the signal output unit multiplies the referred pixel values by weighting factors, calculates a sum of values resulting from multiplication, and divides the sum of values by a sum of the weighting factors, and a value calculated by division is output as a single pixel value, and sampling gravity centers each of which is a gravity center of the weighting factors of the predetermined square region are at equal intervals in both vertical and horizontal directions, and the intervals in the vertical direction are identical with the intervals in the horizontal direction.

3. A solid-state image sensor comprising:

plural photoelectric conversion elements which form a grid pattern and output analog signals in accordance with amounts of received light; and an A/D converter which quantizes the analog signals output from the photoelectric conversion elements into digital signals and outputs the digital signals, wherein, the photoelectric conversion elements respectively have color filters which allow different color components to pass through, and the color filters are Bayer-arranged with red, green, and blue primary colors and divided into plural groups each including color filters of plural colors, the groups being cyclically provided, a signal output unit is further provided to mix up in plural colors of the red, blue, and green colors the digital signals, which are output via the A/D converter, at predetermined sampling positions and at predetermined different rates, and outputs signals which are smaller in number than the photoelectric conversion elements and are in an arrangement constituted by a brightness signal Y and color difference signals C1 and C2, in regard to the digital signals output via the A/D converter, for each of predetermined square regions each having plural rows and plural columns, with reference to plural pixel values of that predetermined square region, the signal output unit multiplies the referred pixel values by weighting factors, calculates a sum of values resulting from multiplication, and divides the sum of values by a sum of the weighting factors, and a value calculated by division is output as a single pixel value, and sampling gravity centers each of which is a gravity center of the weighting factors of the predetermined square region are at equal intervals in both vertical and horizontal directions, and the intervals in the vertical direction are identical with the intervals in the horizontal direction.

4. An imaging apparatus comprising:

an image capture optical system which introduces light and forms a subject image in a solid-state image sensor;

a solid-state image sensor which photo-electrically converts the subject image into signals and outputs the signals; and an image processing unit which conducts predetermined image processing on the signals output from the solid-state image sensor so as to reproduce the subject image, wherein, the solid-state image sensor is identical with the solid-state image sensor of claim 1.

5. An imaging apparatus comprising:

an image capture optical system which introduces light and forms a subject image in a solid-state image sensor;

a solid-state image sensor which photo-electrically converts the subject image into signals and outputs the signals; and an image processing unit which conducts predetermined image processing on the signals output from the solid-state image sensor so as to reproduce the subject image, wherein, the solid-state image sensor is identical with the solid-state image sensor of claim 2, and the image processing unit reproduces the subject image by calculating an average of two consecutive frames output from the solid-state image sensor so as to generate a brightness signal Y of all output pixels in a single frame and by calculating a difference between the two consecutive frames so as to generate a first color difference signal C1 at a green or magenta pixel position in a single frame and a second color difference signal C2 at a green or yellow pixel position in a single frame.

6. The solid-state image sensor according to claim 2, further comprising a switching unit which switches between a first output mode in which the plural digital signals are mixed up and then output from the signal output unit and a second output mode in which digital signals of the respective photoelectric conversion elements are output without being mixed up.

7. The solid-state image sensor according to claim 3, wherein, the number of the color difference signals C1 and C2 generated by the signal output unit is smaller in number than signals representing the brightness Y.

8. The solid-state image sensor according to claim 3, wherein, the signal output unit suppresses false color when at least one of the color difference signals C1 and C2 is generated.

9. The solid-state image sensor according to claim 3, further comprising:
   a variable gain amplifier which varies the intensities of the analog signals output from the photoelectric conversion elements, for each of the plural colors, wherein,
   by the variable gain amplifier, white balance of colors of an image taken by using the solid-state image sensor is adjustable, and
   the analog signals whose white balance has been adjusted are input to the A/D converter.

10. The imaging apparatus according to claim 5, wherein, the signal output unit of the solid-state image sensor is arranged to be able to differentiate, in each frame, a mixture rate of optical outputs having the plural different colors, even at identical sampling positions.

* * * * *